US012804631B2

(12) United States Patent
Turtinen et al.

(10) Patent No.: US 12,804,631 B2
(45) Date of Patent: Nov. 17, 2026

(54) MECHANISM FOR CONFIGURED GRANT TRANSMISSION

(71) Applicant: Nokia Technologies Oy, Espoo (FI)

(72) Inventors: Samuli Heikki Turtinen, Ii (FI); Chunli Wu, Beijing (CN); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 246 days.

(21) Appl. No.: 18/729,302

(22) PCT Filed: Jan. 17, 2022

(86) PCT No.: PCT/CN2022/072420

§ 371 (c)(1),
(2) Date: Jul. 16, 2024

(87) PCT Pub. No.: WO2023/133903

PCT Pub. Date: Jul. 20, 2023

(65) Prior Publication Data

US 2025/0097930 A1 Mar. 20, 2025

(51) Int. Cl.

| | |
|---|---|
| ***H04W 72/115*** | (2023.01) |
| ***H04W 74/0833*** | (2024.01) |
| ***H04W 76/27*** | (2018.01) |
| ***H04W 76/38*** | (2018.01) |

(52) U.S. Cl.
CPC ...... *H04W 72/115* (2023.01); *H04W 74/0833* (2013.01); *H04W 76/27* (2018.02); *H04W 76/38* (2018.02)

(58) Field of Classification Search
CPC ........... H04W 72/115; H04W 74/0833; H04W 76/27; H04W 76/38; H04W 56/0045; H04W 72/23
See application file for complete search history.

(56) References Cited

U.S. PATENT DOCUMENTS

2012/0113904 A1* 5/2012 Anderson ............ H04W 76/28 370/329
2012/0113905 A1* 5/2012 Anderson ............ H04W 76/38 370/329
2016/0242176 A1* 8/2016 Sun ...................... H04W 72/23
2017/0289877 A1* 10/2017 Wu ...................... H04W 36/08
2019/0377894 A1* 12/2019 Jang .................... G06F 21/6218
2021/0168895 A1* 6/2021 Sha .................. H04W 52/0235
2021/0315049 A1* 10/2021 Wei ...................... H04W 76/27
2022/0124780 A1* 4/2022 Lei ...................... H04L 1/1671
2022/0330317 A1* 10/2022 Lee .................. H04W 72/1268
(Continued)

*Primary Examiner* — Christine Ng
(74) *Attorney, Agent, or Firm* — Barta Jones, PLLC

(57) ABSTRACT

Mechanism on configured grant transmissions is provided. According to embodiments of the present disclosure, after transmitting a configured grant transmission to the network device, the terminal device receives a response to the configured grant transmission. In some embodiments, if the response comprises a timing advance command, the timer for validity of the configured grant transmission is stopped. Alternatively, if the response does not comprise a timing advance command, the timer for validity of the configured grant transmission is stopped and the resources for the configured grant transmission are released. In this way, the terminal device only needs to maintain one timer during the configured grant transmission procedure.

20 Claims, 10 Drawing Sheets

(56) References Cited

U.S. PATENT DOCUMENTS

| | | | | |
|---|---|---|---|---|
| 2022/0353943 | A1* | 11/2022 | Lee | H04W 72/23 |
| 2023/0084239 | A1* | 3/2023 | Cha | H04W 52/146<br>455/522 |
| 2023/0156814 | A1* | 5/2023 | Mo | H04W 74/0833<br>370/329 |

* cited by examiner

MECHANISM FOR CONFIGURED GRANT TRANSMISSION

FIELD

Embodiments of the present disclosure generally relate to communication techniques, and more particularly, to methods, devices and computer readable medium for configured grant transmissions.

BACKGROUND

With developments of communication systems, new technologies have been proposed. For example, to increase the utilization ratio of periodically allocated resources, the communication system may enable multiple devices to share the periodic resources allocated with a configured grant (CG) mechanism. The base station allocates the configured grant resources to multiple terminal devices, and the terminal devices utilize the resources when they have data to transmit. By assigning the configured grant resources, the communication system eliminates the packet transmission delay due to a scheduling request procedure.

SUMMARY

Generally, embodiments of the present disclosure relate to a method for configured grant transmissions and corresponding devices.

In a first aspect, there is provided a first device. The first device comprises at least one processor; and at least one memory including computer program codes; the at least one memory and the computer program codes are configured to, with the at least one processor, cause the first device to: receive, from a second device, a configuration indicating a set of resources allocated for a configured grant transmission; during the running time of a first timer for validity of the set of resources, transmit the configured grant transmission to the second device based on the set of resources; receive from the second device a response for the configured grant transmission; and stop the first timer upon reception of a timing advance command from the second device.

In a second aspect, there is provided a first device. The first device comprises at least one processor; and at least one memory including computer program codes; the at least one memory and the computer program codes are configured to, with the at least one processor, cause the first device to: receive, from a second device, a configuration indicating a set of resources allocated for a configured grant transmission; during the running time of a first timer for validity of the set of resources, transmit the configured grant transmission to the second device based on the set of resources; receive from the second device a response for the configured grant transmission; and stop the first timer upon reception of the response from the second device.

In a third aspect, there is provided a first device. The first device comprises at least one processor; and at least one memory including computer program codes; the at least one memory and the computer program codes are configured to, with the at least one processor, cause the first device to: receive, from a second device, a configuration indicating a set of resources allocated for a configured grant transmission; during the running time of a first timer for validity of the set of resources, transmit the configured grant transmission to the second device based on the set of resources; receive from the second device a response for the configured grant transmission; and in accordance with a determination that there is no timing advance command in the response, declare a failure of the configured grant transmission.

In a fourth aspect, there is provided a method. The method comprises receiving, at a first device and from a second device, a configuration indicating a set of resources allocated for a configured grant transmission; during the running time of a first timer for validity of the set of resources, transmitting the configured grant transmission to the second device based on the set of resources; receiving from the second device a response for the configured grant transmission; and stopping the first timer upon reception of a timing advance command from the second device.

In a fifth aspect, there is provided a method. The method comprises receiving, at a first device and from a second device, a configuration indicating a set of resources allocated for a configured grant transmission; during the running time of a first timer for validity of the set of resources, transmitting the configured grant transmission to the second device based on the set of resources; receiving from the second device a response for the configured grant transmission; and stopping the first timer upon reception of the response from the second device.

In a sixth aspect, there is provided a method. The method comprises receiving, at a first device and from a second device, a configuration indicating a set of resources allocated for a configured grant transmission; during the running time of a first timer for validity of the set of resources, transmitting the configured grant transmission to the second device based on the set of resources; receiving from the second device a response for the configured grant transmission; and in accordance with a determination that there is no timing advance command in the response, declaring a failure of the configured grant transmission.

In a seventh aspect, there is provided a computer readable medium comprising program instructions for causing an apparatus to perform at least the method according to the above fourth, fifth, or sixth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
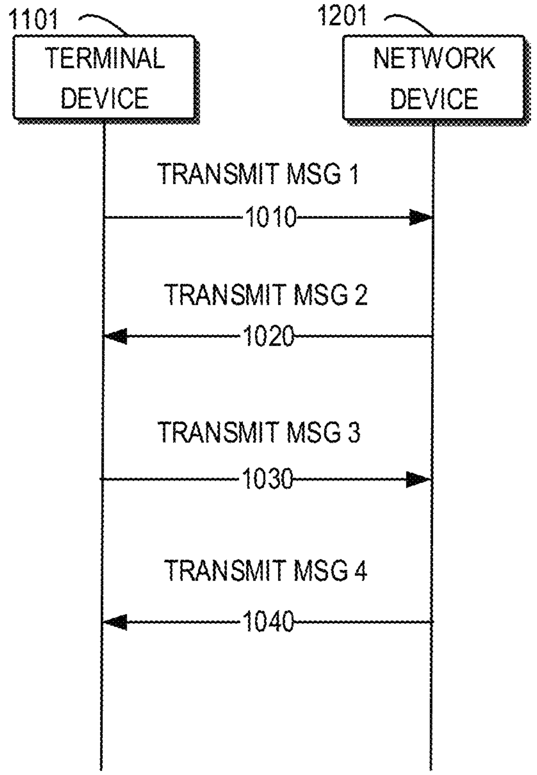
FIGS. 1A-1C illustrate schematic diagrams of small stat transmission (SDT) solutions, respectively.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As mentioned above, the configured grant (CG) based uplink transmission has been proposed. According to some technologies, small data transmission can be supported. FIG. 1A shows a schematic diagram of interactions for 4-step random access channel (RACH) based SDT (i.e. 4-step RA-SDT). As shown in FIG. 1A, a terminal device 1101 can transmit 1010 a message 1 (MSG 1) to a network device 1201 when the terminal device 1101 is in a radio resource control (RRC) inactive state. The MSG 1 comprises a preamble for the RACH. The network device 1201 can transmit 1020 a message 2 (MSG 2) to the terminal device 110. The MSG 2 comprises a random access response. The terminal device 1101 can transmit 1030 a message 3 (MSG 3) to the network device 1201. The MSG 3 comprises a RRC connection resume request. A small payload (i.e., the small data) can be transmitted in the MSG 3. For example, the small payload can be multiplexed with the RRC connection resume request. The network device 1201 can transmit 1040 a RRC release message.

Figure 1B:
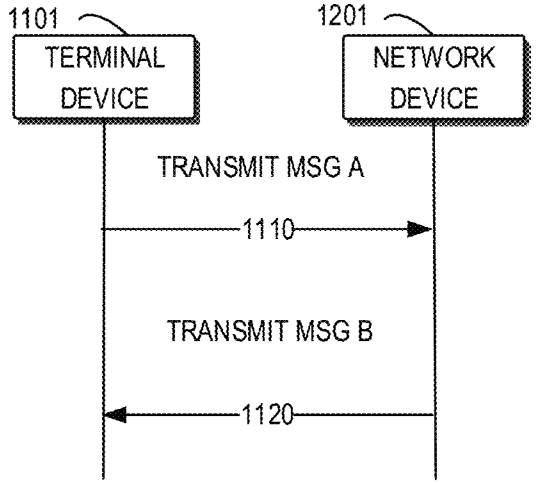

FIG. 1B shows a schematic diagram of interactions for 2-step RACH based SDT (i.e. 2-step RA-SDT). As shown in FIG. 1B, when the terminal device 1101 is in the RRC inactive state, the terminal device 1101 transmits 1110 a message A (MSG A) to the network device 1201. The MSG A can comprise a preamble for the RACH. The small data can be transmitted with the MSG A. In particular, the small data can be transmitted on physical uplink shared channel (PUSCH) resources that are pre-configured by the network device 1201 and are broadcasted in system information with associated physical transmission parameters. The network device 1201 transmits 1120 a message B (MSG B) to the terminal device 1101. The MSG B comprises a random access response.

Figure 1C:
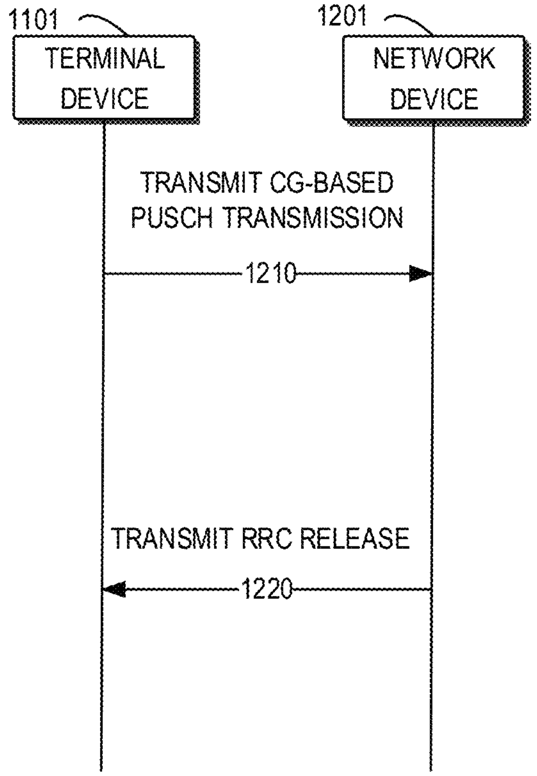

FIG. 1C shows a schematic diagram of interactions for Configured Grant based SDT (i.e. CG-SDT). When the terminal device 1101 is in a RRC Connected state, the terminal device 1101 can transmit 1210 a CG type1 configuration that indicates specific pre-configured PUSCH resources to be used for UL data transmission in RRC Inactive as long as the timing alignment of the terminal device 1101 is valid. The network device 1201 can transmit 1220 a RRC release message.

In wireless systems, it is required to adjust a timing of an uplink frame in order to have alignment with a downlink frame in time domain. According to some conventional technologies, the timing advance (TA) value corresponds to the round trip time between the network device and the terminal device. The timing advance adjustment can take place both during the RACH procedure (for example, via a timing advance command in a random access response) and during a normal operation of the terminal device in RRC Connected state (for example, via a timing advance command in a control element of the medium access control layer). The term "timing advance command (TAC)" used herein can refer to a command sent by a network device to a terminal device to adjust its current timing advance to apply to an uplink transmission. This means that the terminal device advances a transmission to the network associated to a given UL frame by a certain amount of time with respect to the corresponding DL frame according to the received timing advance command. This is applied for e.g. PUSCH, physical uplink control channel (PUCCH) and sounding reference signal (SRS) transmission. Basically, the TAC can inform the terminal device of the amount of time that the terminal device needs to advance the UL transmissions. Alternatively or additionally, the TAC can inform the terminal device the amount of time that the terminal device needs to advance the UL transmissions compared to the current timing alignment value.

According to some conventional technologies, a timing alignment timer (TAT), the value of which is configured in system information block (SIB), can be used for UL timing maintenance during RA-SDT procedure. The terminal device can start or restart this TAT when a random access response (RAR) TAC or a TAC medium access control (MAC) control element (CE) is received from the network device, regardless of SDT procedure. In addition, according to some other conventional technologies, a new timer for CG-SDT (i.e., the CG-SDT validity timer) has been proposed. For example, when the CG-SDT validity timer expires and the UE is not in SDT session, CG-SDT resources can be released. Once CG-SDT session starts, CG-SDT validity timer may be stopped. When TAC MAC CE is received, the UE may start the legacy TAT. In other words, the CG-SDT validity timer may be stopped only after the network device responds to the initial CG-SDT transmission. However, the initial CG-SDT transmission may not be successful. If the initial CG-SDT transmission fails and the response does not comprise the TAC MAC CE, there is no running timer for timing alignment. In this case, the terminal device cannot perform transmissions. Therefore, new solutions for handling different timing alignment timers are needed.

In order to solve at least part of the above problems and other potential problems, solutions on handling different timing alignment timers are proposed. According to embodiments of the present disclosure, after transmitting a configured grant transmission to the network device, the terminal device receives a response to the configured grant transmission. In some embodiments, if the response comprises a TAC, the timer for validity of the CG-SDT is stopped. Alternatively, if the response does not comprise a TAC, the timer for validity of the CG-SDT is stopped and the resources for the configured grant transmission are released. In this way, the terminal device only needs to maintain one timer during the configured grant transmission procedure. The network device is able to release the resources for the configured grant transmission without RRC reconfiguration.

Figure 2:
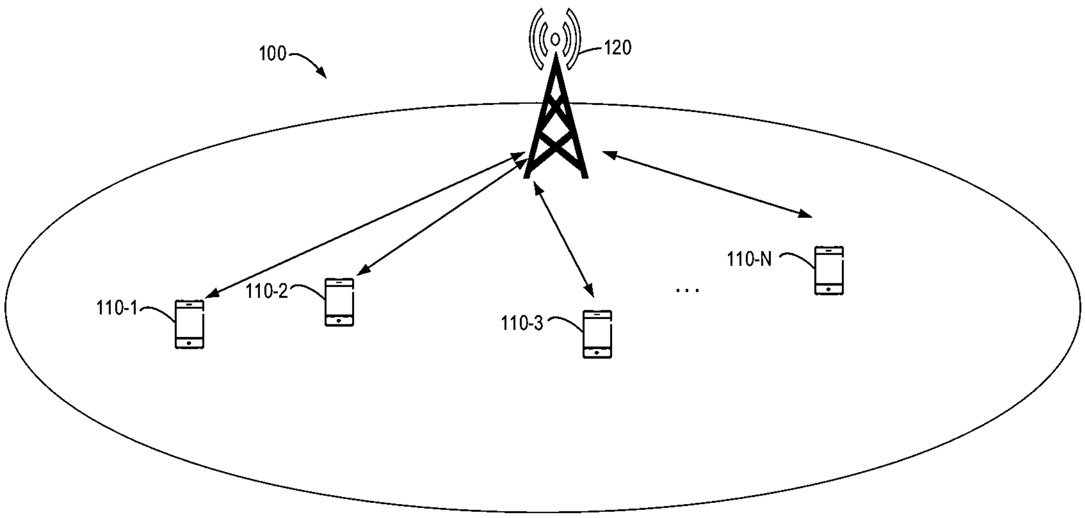
FIG. 2 illustrates a schematic diagram of a communication system according to according to embodiments of the present disclosure.

FIG. 2 illustrates a schematic diagram of a communication system in which embodiments of the present disclosure can be implemented. The communication system 100, which is a part of a communication network, comprises a first device 110-1, a first device 110-2, a first device 110-3 . . . , a first device 110-N, which can be collectively referred to as "first device(s) 110." The communication system 100 further comprises a second device 120. It is to be understood that the number of devices shown in FIG. 2 is given for the purpose of illustration without suggesting any limitations. The communication system 100 may comprise any suitable number of devices and cells. In the communication system 100, the first device 110 and the second device 120 can communicate data and control information to each other. In the case that the first device 110 is the terminal device and the second device 120 is the network device, a link from the second device 120 to the first device 110 is referred to as a downlink (DL), while a link from the first device 110 to the second device 120 is referred to as an uplink (UL).

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 3:
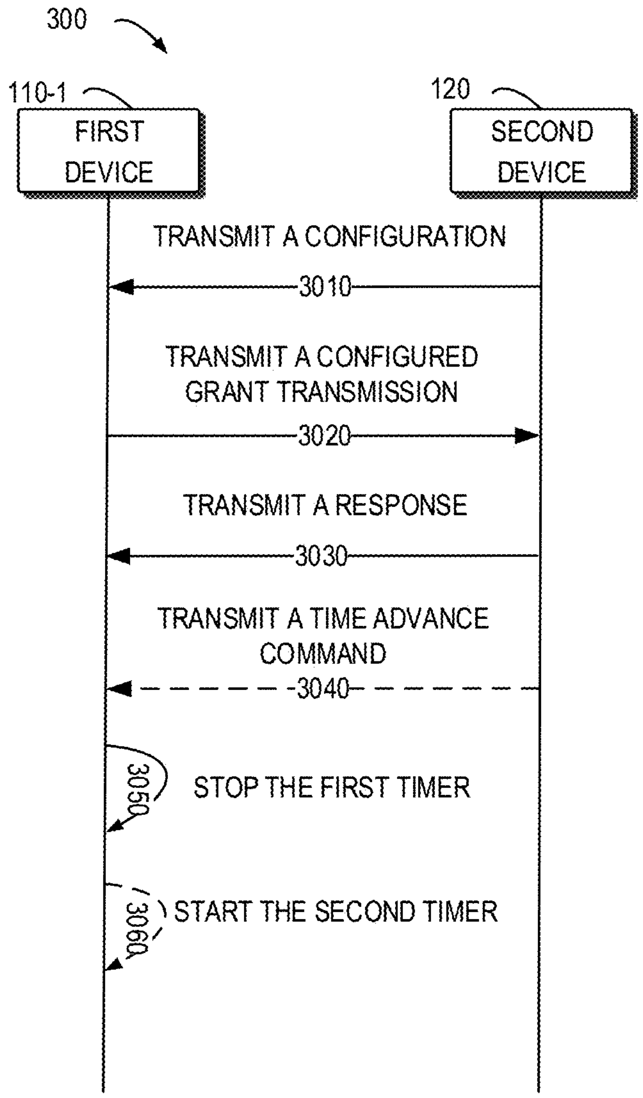
FIG. 3 illustrates a schematic diagram of interactions between devices according to according to embodiments of the present disclosure.

Example embodiments of the present disclosure will be described in detail below with reference to the accompanying drawings. Reference is now made to FIG. 3, which illustrates a signaling flow 300 according to example embodiments of the present disclosure. Only for the purpose of illustrations, the signaling flow 300 involves the first device 110-1 and the second device 120.

The second device 120 transmits 3010 a configuration indicating a set of resources allocated for a configured grant (CG) transmission to the first device 110-1. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by e.g. PDCCH, and stored or cleared as configured uplink grant based on physical layer signal (e.g. PDCCH DCI) indicating configured grant activation or deactivation. In some embodiments, the configuration can be transmitted in RRC signaling. Alternatively, the configuration can be transmitted in PDCCH signaling. The second device 120 may transmit 3010 a Cell Radio Network Temporary Identifier (C-RNTI) configuration to the first device 110-1 for use in the SDT session.

Figure 6:
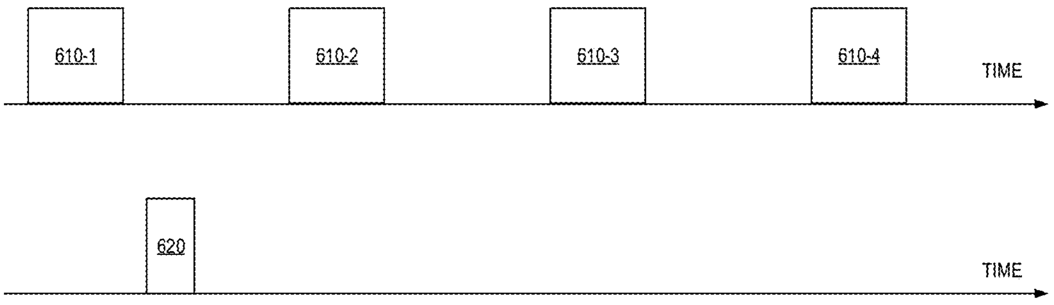
FIG. 6 illustrates a schematic diagram of a configured grant configuration according to embodiments of the present disclosure.

Both type 1 and type 2 can be configured per serving cell and per bandwidth part (BWP). For type 2 grant, activation and deactivation can be independent among the serving cells. When the configured grant type 1 is used, the resource configuration can include one or more of following parameters: a configured scheduling radio network temporary identifier (CS-RNTI) for retransmission; periodicity of the configured grant type 1; an offset of a resource with respect to a system frame number in time domain; time-domain parameters which include a start symbol and a length of an assignment; and the number of hybrid automatically repeat request (HARQ) processes. Alternatively, when the configured grant type 2 is going to be used, the configuration can include one or more of following parameters: a CS-RNTI for activation, deactivation, and retransmission; the periodicity of the configured grant type 2; and the number of HARQ processes. FIG. 6 shows an example of the configuration of the CG transmission. As shown in FIG. 6, the set of resources allocated for the CG transmission can comprise a plurality of CG occasions 610-1, 610-2, 610-3, and 610-4. It should be noted that the number of CG occasions shown in FIG. 6 is only an example not limitations. Data can be transmitted during the CG occasions. A CG occasion may comprise a certain amount of time-domain and/or frequency-domain resources.

The first device 110-1 may be configured with a first timer for validity of the set of resources allocated for the configured grant transmission. The first timer can be associated with a timing advance. For example, the timing advance remains valid when the first timer is running. For example, the first timer may be configured together with the set of resources. Alternatively, the first timer may be configured separately from the set of resources. In some embodiments, a configuration of the first timer can be transmitted in RRC signaling. For example, the first timer can be transmitted in RRC Release message. Alternatively, the configuration of the first timer can be transmitted in system information signaling. Alternatively, the configuration of the first timer can be transmitted in PDCCH signaling. The value of the first timer can be configured by the second device 120 or can be predefined.

The first device 110-1 may also be configured with a second timer for timing alignment. The second timer can be associated with the timing advance. In some embodiments, the second timer can be a timing alignment timer (TAT). For example, the timing advance remains valid as long as the second timer is running. The timing advance may be no longer valid after the second timer expires. The length/value of the second timer can be configured by the second device 120.

Referring back to FIG. 3, the first device 110-1 transmits 3020 a CG transmission to the second device 120 during the running time of the first timer. For example, in some embodiments, the first device 110-1 can compare a data volume for the generated data with a data volume threshold. For example, if the data volume of the data generated at the time 620 exceeds the data volume threshold, the first device 110-1 can determine that the small data transmission is not applicable to the data generated at the time 620. Alternatively, if the data volume of the data generated at the time 620 is below the data volume threshold, the first device 110-1 can determine that the small data transmission is applicable to the data generated at the time 620. In this case, the CG transmission can be a CG-SDT and the first device 110-1 may transmit the CG transmission on, for example, the CG occasion 610-2. The data volume threshold can be configured by the second device 120. Alternatively, the data volume threshold can be pre-configured. Additionally, the first device 110-1 can determine whether a data radio bearer of the SDT is valid.

The second device 120 transmits 3030 a response for the CG transmission to the first device 110-1. For example, the response for the CG transmission may be a PDCCH transmission addressed to the C-RNTI or the CS-RNTI of the first device 110-1. Alternatively, the response for the CG transmission may be a PDSCH transmission which is scheduled by a PDCCH addressed to the C-RNTI or CS-RNTI of the first device 110-1. If the first device 110-1 receives a TAC from the second device 120, the first device 110-1 stops 3050 the first timer. For example, in some embodiments, if the response comprises the TAC, the first device 110-1 may stop the first timer based on the TAC in the response. In this way, only one timer can be maintained during the CG transmission procedure.

In some other embodiments, the response may not comprise the TAC. In this case, the first device 110-1 may keep the first timer running until the TAC is received or until the first timer expires. For example, in some embodiments, the second device 120 may transmit 3040 the TAC to the first device 110-1. In this case, the first device 110-1 may stop the first timer based on the reception (3040) of the TAC. In some other embodiments, the first device 110-1 may keep the first timer running until the first timer expires. In this way, the UE behavior is well definite when the TAC is not provided in the response for the CG transmission.

In some embodiments, the first device 110-1 may start 3060 the second timer upon the reception of the TAC. For example, if the response comprises the TAC, the first device 110-1 may start the second timer based on the TAC in the response. Alternatively, if the response does not comprise the TAC, the first device 110-1 may not start the second timer.

The first device 110-1 may perform the CG transmission using the set of resources during the running time of the first timer or the running time of the second timer. In other words, the set of resources can be valid during the running time of the first timer or the running time of the second timer.

According to embodiments described with reference to FIG. 3, the first timer can be stopped based on the TAC. In this way, only one timer can be maintained during the CG transmission and it avoids an unexpected situation where no timing advance is available. Moreover, the network can retain the configuration for the CG transmission for the first device 110-1 until the first timer expires. The network can continue the usage of the configuration for the CG transmission by providing the TAC before expiration of the first timer.

Figure 4:
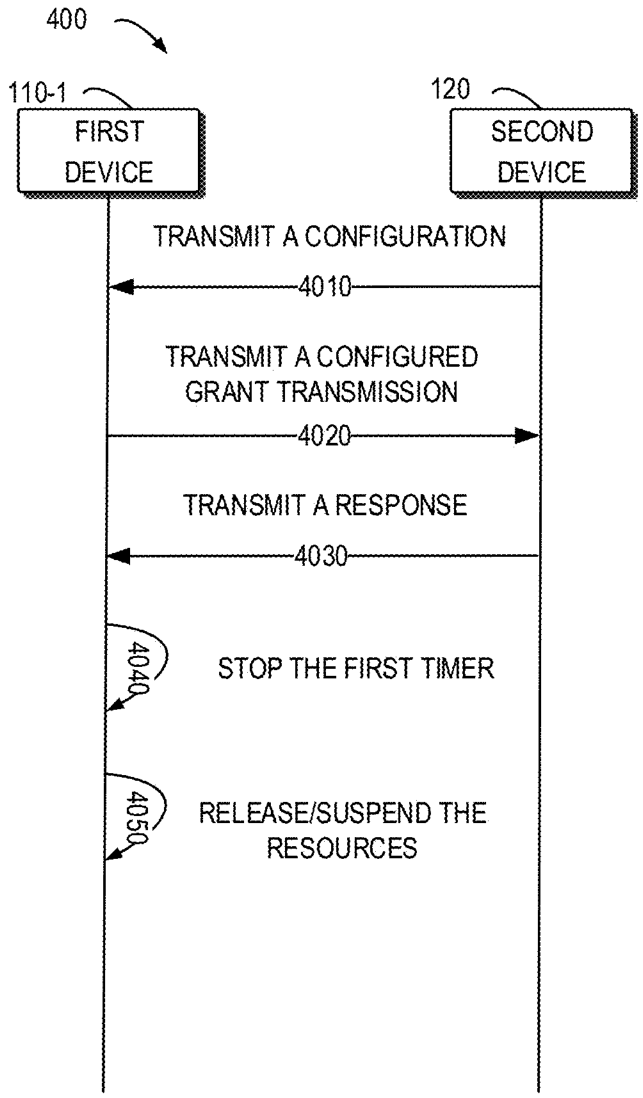
FIG. 4 illustrates a schematic diagram of interactions between devices according to according to embodiments of the present disclosure.

Reference is now made to FIG. 4, which illustrates a signaling flow 400 according to example embodiments of the present disclosure. Only for the purpose of illustrations, the signaling flow 400 involves the first device 110-1 and the second device 120.

The second device 120 transmits 4010 a configuration indicating a set of resources allocated for a configured grant (CG) transmission to the first device 210-1. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by e.g. PDCCH and stored or cleared as configured uplink grant based on physical layer signal (e.g. PDCCH DCI) indicating configured activation or deactivation. In some embodiments, the configuration can be transmitted in RRC signaling. Alternatively, the configuration can be transmitted in PDCCH signaling.

Both type 1 and type 2 can be configured per serving cell and per bandwidth part (BWP). For type 2 grant, activation and deactivation can be independent among the serving cells. When the configured grant type 1 is used, the resource configuration can include one or more of following parameters: a configured scheduling radio network temporary identifier (CS-RNTI) for retransmission; periodicity of the configured grant type 1; an offset of a resource with respect to a system frame number in time domain; time-domain parameters which include a start symbol and a length of an assignment; and the number of hybrid automatically repeat request (HARQ) processes. Alternatively, when the configured grant type 2 is going to be used, the configuration can include one or more of following parameters: a CS-RNTI for activation, deactivation, and retransmission; the periodicity of the configured grant type 2; and the number of HARQ processes. FIG. 6 shows an example of the configuration of the CG transmission. As shown in FIG. 6, the set of resources allocated for the CG transmission can comprise a plurality of CG occasions 610-1, 610-2, 610-3, and 610-4. It should be noted that the number of CG occasions shown in FIG. 6 is only an example not limitations. Data can be transmitted during the CG occasions. A CG occasion may comprise a certain amount of time-domain and/or frequency-domain resources.

The first device 110-1 may be configured with a first timer for validity of the set of resources allocated for the configured grant transmission. The first timer can be associated with a timing advance. For example, the timing advance remains valid when the first timer is running. For example, the first timer may be configured together with the set of resources. Alternatively, the first timer may be configured separately from the set of resources. In some embodiments, a configuration of the first timer can be transmitted in RRC signaling. For example, the first timer can be transmitted in RRC Release message. Alternatively, the configuration of the first timer can be transmitted in system information signaling. Alternatively, the configuration of the first timer can be transmitted in PDCCH signaling. The value of the first timer can be configured by the second device 120 or can be predefined.

The first device 110-1 may also be configured with a second timer for timing alignment. The second timer can be associated with the timing advance. In some embodiments, the second timer can be a timing alignment timer (TAT). For example, the timing advance remains valid as long as the second timer is running. The timing advance may be no longer valid after the second timer expires. The length/value of the second timer can be configured by the second device 120.

Referring back to FIG. 4, the first device 110-1 transmits 4020 a CG transmission to the second device 120 during the running time of the first timer. For example, in some embodiments, the first device 110-1 can compare a data volume for the generated data with a data volume threshold. For example, if the data volume of the data generated at the time 620 exceeds the data volume threshold, the first device 110-1 can determine that the small data transmission is not applicable to the data generated at the time 620. Alternatively, if the data volume of the data generated at the time 620 is below the data volume threshold, the first device 110-1 can determine that the small data transmission is applicable to the data generated at the time 620. In this case, the CG transmission can be a CG-SDT and the first device 110-1 may transmit the CG transmission on e.g. the CG occasion 610-2. The data volume threshold can be configured by the second device 120. Alternatively, the data volume threshold can be pre-configured. Additionally, the first device 110-1 can determine whether a data radio bearer of the SDT is valid.

The second device 120 transmits 4030 a response for the CG transmission to the first device 110-1. For example, the response for the CG transmission may be PDCCH transmission addressed to the C-RNTI or the CS-RNTI of the first device 110-1. Alternatively, the response for the CG transmission may be a PDSCH transmission which is scheduled by a PDCCH addressed to the C-RNTI or CS-RNTI of the first device 110-1. The first device 110-1 stops 4040 the first timer based on the response. In other words, no matter whether the response comprises the TAC or not, the first device 110-1 can stop the first timer upon reception (4030) of the response.

In some other embodiments, the response may not comprise the TAC. In this case, the first device 110-1 may release 4050 the set of resources for the CG transmission. Alternatively, the first device 110-1 may suspend 4050 the set of resources for the CG transmission. In other words, the set of resources for the CG transmission can be released or suspended if no TAT (i.e., the first timer or the second timer) remains running at the first device 110-1. In this case, the first device 110-1 has no TAT running and any UL transmission may require RA procedure to be triggered unless the second device 120 provides TAC MAC CE before that. In this way, the network is able to release resources allocated for the CG transmission without RRC reconfiguration for the SDT session and work only with dynamic scheduling.

In some embodiments, the first device 110-1 may start the second timer upon reception of the TAC. For example, if the response comprises the TAC, the first device 110-1 may start the second timer based on the TAC in the response. Alternatively, if the response does not comprise the TAC, the first device 110-1 may not start the second timer.

According to embodiments described with reference to FIG. 4, the first timer can be stopped based on the response for the CG transmission, regardless whether the response comprises the TAC. In this way, only one timer can be maintained during the CG transmission. Moreover, it can also achieve that the network can release the resources for CG transmission for the UE after the SDT procedure has been completed and continue solely with dynamic scheduling for optimum performance.

Figure 5:
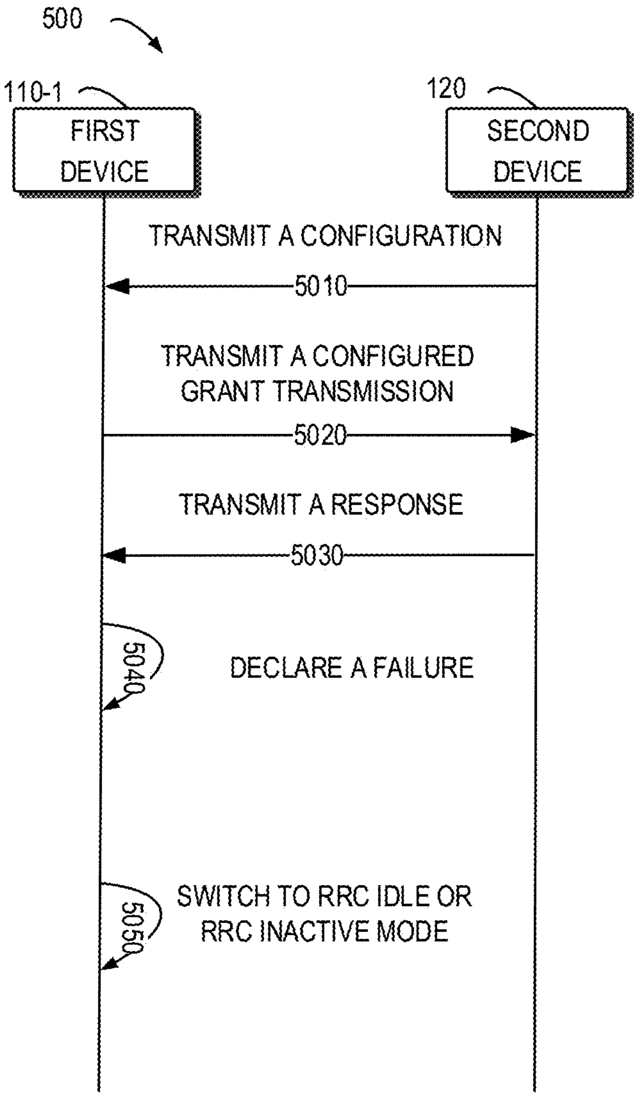
FIG. 5 illustrates a schematic diagram of interactions between devices according to according to embodiments of the present disclosure.

Reference is now made to FIG. 5, which illustrates a signaling flow 500 according to example embodiments of the present disclosure. Only for the purpose of illustrations, the signaling flow 500 involves the first device 110-1 and the second device 120.

The second device 120 transmits 5010 a configuration indicating a set of resources allocated for a configured grant (CG) transmission to the first device 210-1. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by e.g. PDCCH and stored or cleared as configured uplink grant based on physical layer signal (e.g. PDCCH DCI) indicating configured activation or deactivation. In some embodiments, the configuration can be transmitted in RRC signaling. Alternatively, the configuration can be transmitted in PDCCH signaling.

Both type 1 and type 2 can be configured per serving cell and per bandwidth part (BWP). For type 2 grant, activation and deactivation can be independent among the serving cells. When the configured grant type 1 is used, the resource configuration can include one or more of following parameters: a configured scheduling radio network temporary identifier (CS-RNTI) for retransmission; periodicity of the configured grant type 1; an offset of a resource with respect to a system frame number in time domain; time-domain parameters which include a start symbol and a length of an assignment; and the number of hybrid automatically repeat request (HARQ) processes. Alternatively, when the configured grant type 2 is going to be used, the configuration can include one or more of following parameters: a CS-RNTI for activation, deactivation, and retransmission; the periodicity of the configured grant type 2; and the number of HARQ processes. FIG. 6 shows an example of the configuration of the CG transmission. As shown in FIG. 6, the set of resources allocated for the CG transmission can comprise a plurality of CG occasions 610-1, 610-2, 610-3, and 610-4. It should be noted that the number of CG occasions shown in FIG. 6 is only an example not limitations. Data can be transmitted during the CG occasions. A CG occasion may comprise a certain amount of time-domain and/or frequency-domain resources.

The first device 110-1 may be configured with a first timer for validity of the set of resources allocated for the configured grant transmission. The first timer can be associated with a timing advance. For example, the timing advance remains valid when the first timer is running. For example, the first timer may be configured together with the set of resources. Alternatively, the first timer may be configured separately from the set of resources. In some embodiments, a configuration of the first timer can be transmitted in RRC signaling. For example, the first timer can be transmitted in RRC Release message. Alternatively, the configuration of the first timer can be transmitted in system information signaling. Alternatively, the configuration of the first timer can be transmitted in PDCCH signaling. The value of the first timer can be configured by the second device 120 or can be predefined.

The first device 110-1 may also be configured with a second timer for timing alignment. The second timer can be associated with the timing advance. In some embodiments, the second timer can be a timing alignment timer (TAT). For example, the timing advance remains valid as long as the second timer is running. The timing advance may be no longer valid after the second timer expired. The length/value of the second timer can be configured by the second device 120.

Referring back to FIG. 5, the first device 110-1 transmits 5020 a CG transmission to the second device 120 during the running time of the first timer. For example, in some embodiments, the first device 110-1 can compare a data volume for the generated data with a data volume threshold. For example, if the data volume of the data generated at the time 620 exceeds the data volume threshold, the first device 110-1 can determine that the small data transmission is not applicable to the data generated at the time 620. Alternatively, if the data volume of the data generated at the time 620 is below the data volume threshold, the first device 110-1 can determine that the small data transmission is applicable to the data generated at the time 620. In this case, the CG transmission can be a CG-SDT and the first device 110-1 may transmit the CG transmission on e.g. the CG occasion 610-2. The data volume threshold can be configured by the second device 120. Alternatively, the data volume threshold can be pre-configured. Additionally, the first device 110-1 can determine whether a data radio bearer of the SDT is valid.

The second device 120 transmits 5030 a response for the CG transmission to the first device 110-1. For example, the response for the CG transmission may be PDCCH transmission addressed to the C-RNTI or the CS-RNTI of the first device 110-1. In this case, the response comprises the TAC.

Alternatively, the response for the CG transmission may be a PDSCH transmission which is scheduled by a PDCCH addressed to the C-RNTI or CS-RNTI of the first device 110-1. In other words, the second device 120 needs to provide the TAC in the response.

If the response does not comprise the TAC, the first device 110-1 declares 5040 a failure of the CG transmission procedure. In this case, the first device 110-1 may switch 5050 to RRC_IDLE state. Alternatively, the first device 110-1 may switch 5050 to RRC_INACTIVE state.

In some embodiments, the first device 110-1 may start the second timer upon the reception of the TAC. For example, if the response comprises the TAC, the first device 110-1 may start the second timer based on the TAC in the response. Alternatively, if the response does not comprise the TAC, the first device 110-1 may start the second timer based on the reception of the TAC.

According to embodiments described with the reference to FIG. 5, the second device 120 needs to include the TAC into the response. If the response does not comprise the TAC, the first device 110-1 considers this situation as a failure in CG transmission or failure in SDT procedure. In this case, the first device 110-1 may switch to RRC_IDLE state. Alternatively, the first device 110-1 may switch to RRC_INACTIVE state. In this way, the UE behavior is well definite when the TAC is not provided in the response for the CG transmission.

Figure 7:
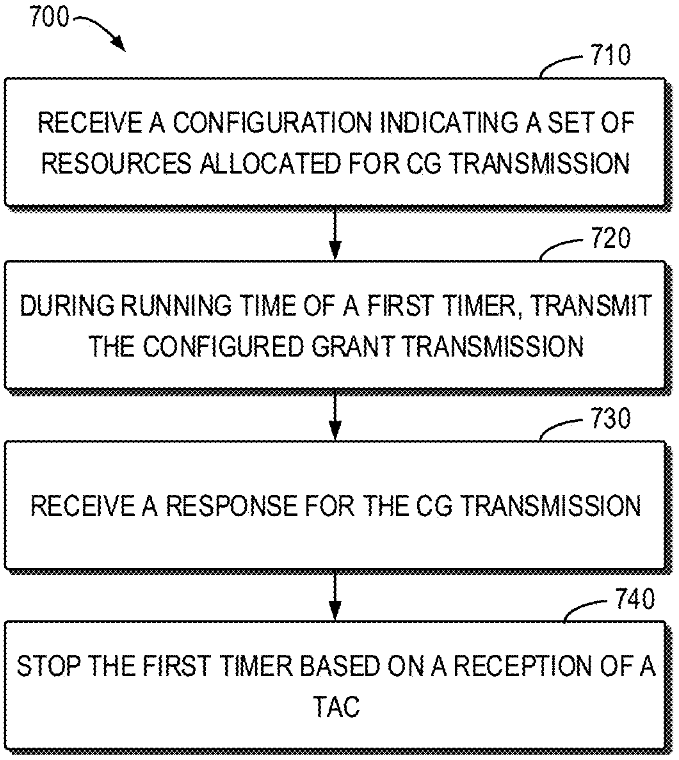
FIG. 7 illustrates a flow chart of a method according to some embodiments of the present disclosure.

FIG. 7 illustrates a flow chart of method 700 according to embodiments of the present disclosure. The method 700 can be implemented at any suitable devices. For example, the method may be implemented at the first device 110-1.

At block 710, the first device 110-1 receives a configuration indicating a set of resources allocated for a configured grant (CG) transmission from the second device 120. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by e.g. PDCCH and stored or cleared as configured uplink grant based on physical layer signal (e.g. PDCCH DCI) indicating configured activation or deactivation. In some embodiments, the configuration can be transmitted in RRC signaling. Alternatively, the configuration can be transmitted in PDCCH signaling.

Both type 1 and type 2 can be configured per serving cell and per bandwidth part (BWP). For type 2 grant, activation and deactivation can be independent among the serving cells. When the configured grant type 1 is used, the resource configuration can include one or more of following parameters: a configured scheduling radio network temporary identifier (CS-RNTI) for retransmission; periodicity of the configured grant type 1; an offset of a resource with respect to a system frame number in time domain; time-domain parameters which include a start symbol and a length of an assignment; and the number of hybrid automatically repeat request (HARQ) processes. Alternatively, when the configured grant type 2 is going to be used, the configuration can include one or more of following parameters: a CS-RNTI for activation, deactivation, and retransmission; the periodicity of the configured grant type 2; and the number of HARQ processes.

The first device 110-1 may be configured with a first timer for validity of the set of resources allocated for the configured grant transmission. For example, the first timer may be configured together with the set of resources. Alternatively, the first timer may be configured separately from the set of resources. In some embodiments, a configuration of the first timer can be transmitted in RRC signaling. Alternatively, the configuration of the first timer can be transmitted in PDCCH signaling. The value of the first timer can be configured by the second device 120 or can be predefined.

The first device 110-1 may also be configured with a second timer for timing alignment. The second timer can be associated with the timing advance. In some embodiments, the second timer can be a timing alignment timer (TAT). For example, the timing advance remains valid as long as the second timer is running. The timing advance may be no longer valid after the second timer expires. The length/value of the second timer can be configured by the second device 120.

At block 720, the first device 110-1 transmits a CG transmission to the second device 120 during the running time of the first timer. For example, in some embodiments, the first device 110-1 can compare a data volume for the generated data with a data volume threshold.

At block 730, the first device 110-1 receives a response for the CG transmission from the second device 120. At block 740, if the first device 110-1 receives a TAC from the second device 120, the first device 110-1 stops the first timer. For example, in some embodiments, if the response comprises the TAC, the first device 110-1 may stop the first timer based on the TAC in the response. In this way, only one timer can be maintained during the CG transmission procedure.

In some other embodiments, the response may not comprise the TAC. In this case, the first device 110-1 may keep the first timer running until the TAC is received. For example, in some embodiments, the second device 120 may transmit the TAC to the first device 110-1. In this case, the first device 110-1 may stop the first timer based on the reception of the TAC. In some other embodiments, the first device 110-1 may keep the first timer running until the first timer expires. In this way, the UE behavior is well definite when the TAC is not provided in the response for the CG transmission.

In some embodiments, the first device 110-1 may start the second timer upon the reception of the TAC. For example, if the response comprises the TAC, the first device 110-1 may start the second timer based on the TAC in the response. Alternatively, if the response does not comprise the TAC, the first device 110-1 may start the second timer based on the reception of the TAC.

The first device 110-1 may perform the CG transmission using the set of resources during the running time of the first timer or the running time of the second timer. In other words, the set of resources can be valid during the running time of the first timer or the running time of the second timer.

Figure 8:
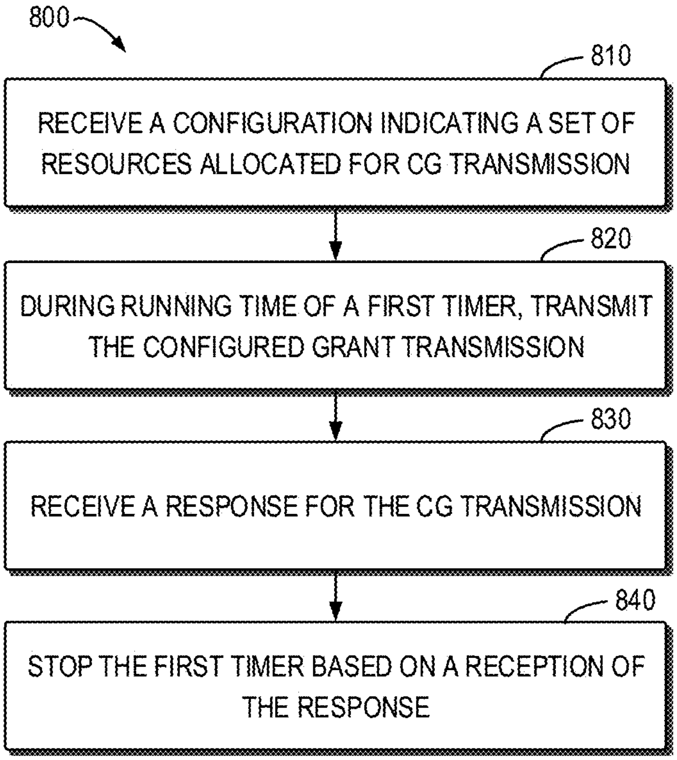
FIG. 8 illustrates a flow chart of a method according to other embodiments of the present disclosure.

FIG. 8 illustrates a flow chart of method 800 according to embodiments of the present disclosure. The method 800 can be implemented at any suitable devices. For example, the method may be implemented at the first device 110-1.

At block 810, the first device 110-1 receives a configuration indicating a set of resources allocated for a configured grant (CG) transmission from the second device 120. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by e.g. PDCCH and stored or cleared as configured uplink grant based on physical layer signal (e.g. PDCCH DCI) indicating configured activation or deactivation. In some embodiments, the configuration can be transmitted in RRC signaling. Alternatively, the configuration can be transmitted in PDCCH signaling.

Both type 1 and type 2 can be configured per serving cell and per bandwidth part (BWP). For type 2 grant, activation and deactivation can be independent among the serving cells. When the configured grant type 1 is used, the resource configuration can include one or more of following parameters: a configured scheduling radio network temporary identifier (CS-RNTI) for retransmission; periodicity of the configured grant type 1; an offset of a resource with respect to a system frame number in time domain; time-domain parameters which include a start symbol and a length of an assignment; and the number of hybrid automatically repeat request (HARQ) processes. Alternatively, when the configured grant type 2 is going to be used, the configuration can include one or more of following parameters: a CS-RNTI for activation, deactivation, and retransmission; the periodicity of the configured grant type 2; and the number of HARQ processes.

The first device 110-1 may be configured with a first timer for validity of the set of resources allocated for the configured grant transmission. For example, the first timer may be configured together with the set of resources. Alternatively, the first timer may be configured separately from the set of resources. In some embodiments, a configuration of the first timer can be transmitted in RRC signaling. Alternatively, the configuration of the first timer can be transmitted in PDCCH signaling. The value of the first timer can be configured by the second device 120 or can be predefined.

The first device 110-1 may also be configured with a second timer for timing alignment. The second timer can be associated with the timing advance. In some embodiments, the second timer can be a timing alignment timer (TAT). For example, the timing advance remains valid as long as the second timer is running. The timing advance may be no longer valid after the second timer expires. The length/value of the second timer can be configured by the second device 120.

At block 820, the first device 110-1 transmits a CG transmission to the second device 120 during the running time of the first timer. For example, in some embodiments, the first device 110-1 can compare a data volume for the generated data with a data volume threshold.

At block 830, the first device 110-1 receives a response for the CG transmission from the second device 120. At block 840, the first device 110-1 stops the first timer based on the response. In other words, no matter whether the response comprises the TAC or not, the first device 110-1 can stop the first timer upon the reception of the response.

In some other embodiments, the response may not comprise the TAC. In this case, the first device 110-1 may release the set of resources for the CG transmission. Alternatively, the first device 110-1 may suspend the set of resources for the CG transmission. In other words, the set of resources for the CG transmission can be released or suspended if no TAT (i.e., the first timer or the second timer) remains running at the first device 110-1. In this case, the first device 110-1 has no TAT running and any UL transmission may require RA procedure to be triggered unless the second device 120 provides TAC MAC CE before that. In this way, the network is able to release resources allocated for the CG transmission without RRC reconfiguration for the SDT session and work only with dynamic scheduling.

In some embodiments, the first device 110-1 may start the second timer upon reception of the TAC. For example, if the response comprises the TAC, the first device 110-1 may start the second timer based on the TAC in the response. Alternatively, if the response does not comprise the TAC, the first device 110-1 may start the second timer based on the reception of the TAC.

Figure 9:
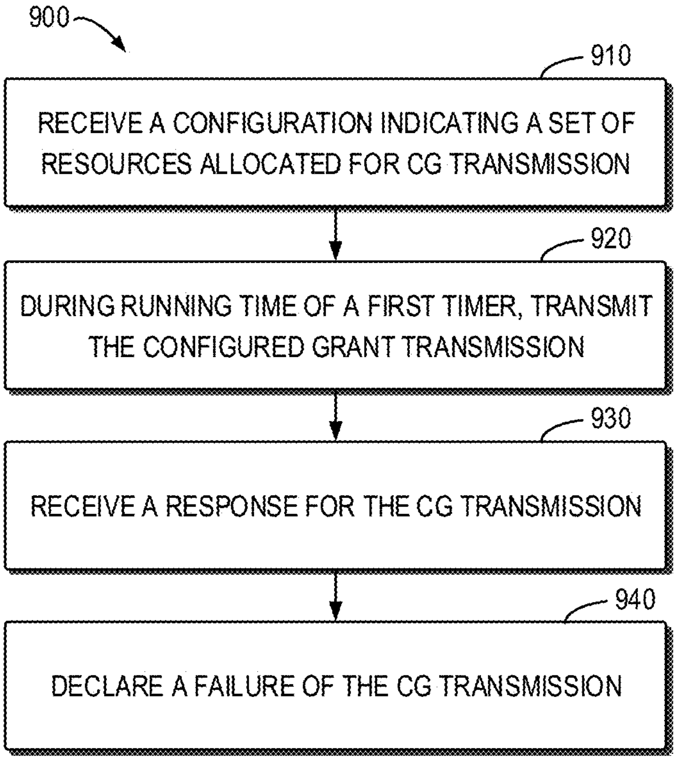
FIG. 9 illustrates a flow chart of a method according to some embodiments of the present disclosure.

FIG. 9 illustrates a flow chart of method 900 according to embodiments of the present disclosure. The method 900 can be implemented at any suitable devices. For example, the method may be implemented at the first device 110-1.

At block 910, the first device 110-1 receives a configuration indicating a set of resources allocated for a configured grant (CG) transmission from the second device 120. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by e.g. PDCCH and stored or cleared as configured uplink grant based on physical layer signal (e.g. PDCCH DCI) indicating configured activation or deactivation. In some embodiments, the configuration can be transmitted in RRC signaling. Alternatively, the configuration can be transmitted in PDCCH signaling.

Both type 1 and type 2 can be configured per serving cell and per bandwidth part (BWP). For type 2 grant, activation and deactivation can be independent among the serving cells. When the configured grant type 1 is used, the resource configuration can include one or more of following parameters: a configured scheduling radio network temporary identifier (CS-RNTI) for retransmission; periodicity of the configured grant type 1; an offset of a resource with respect to a system frame number in time domain; time-domain parameters which include a start symbol and a length of an assignment; and the number of hybrid automatically repeat request (HARQ) processes. Alternatively, when the configured grant type 2 is going to be used, the configuration can include one or more of following parameters: a CS-RNTI for activation, deactivation, and retransmission; the periodicity of the configured grant type 2; and the number of HARQ processes.

The first device 110-1 may be configured with a first timer for validity of the set of resources allocated for the configured grant transmission. For example, the first timer may be configured together with the set of resources. Alternatively, the first timer may be configured separately from the set of resources. In some embodiments, a configuration of the first timer can be transmitted in RRC signaling. Alternatively, the configuration of the first timer can be transmitted in PDCCH signaling. The value of the first timer can be configured by the second device 120 or can be predefined.

The first device 110-1 may also be configured with a second timer for timing alignment. The second timer can be associated with the timing advance. In some embodiments, the second timer can be a timing alignment timer (TAT). For example, the timing advance remains valid as long as the second timer is running. The timing advance may be no longer valid after the second timer expires. The length/value of the second timer can be configured by the second device 120.

At block 920, the first device 110-1 transmits a CG transmission to the second device 120 during the running time of the first timer. For example, in some embodiments, the first device 110-1 can compare a data volume for the generated data with a data volume threshold.

At block 930, the first device 110-1 receives a response for the CG transmission from the second device 120. If the response does not comprise the TAC, the first device 110-1 may, at block 940, declare a failure of the CG transmission procedure or SDT procedure. In this case, the first device 110-1 may switch to RRC_IDLE state. Alternatively, the first device 110-1 may switch to RRC_INACTIVE state.

In some embodiments, the first device 110-1 may start the second timer upon the reception of the TAC. For example, if the response comprises the TAC, the first device 110-1 may start the second timer based on the TAC in the response. Alternatively, if the response does not comprise the TAC, the first device 110-1 may start the second timer based on the reception of the TAC.

Figure 10:
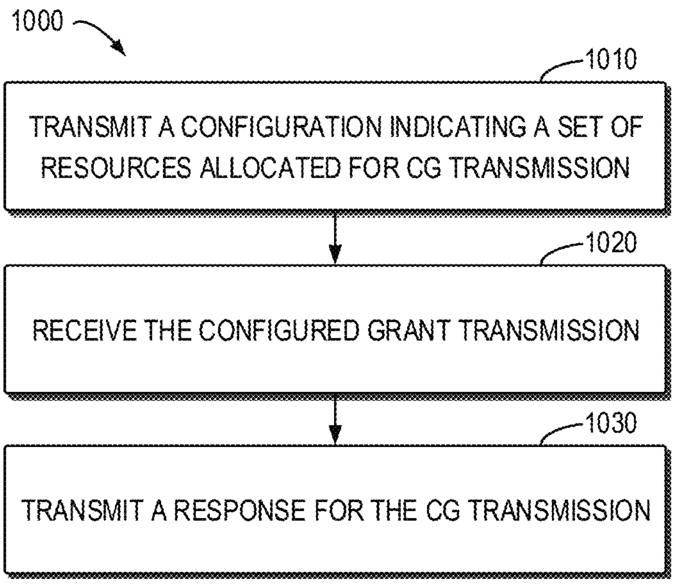
FIG. 10 illustrates a flow chart of a method according to embodiments of the present disclosure.

FIG. 10 illustrates a flow chart of method 1000 of the present disclosure. The method 1000 can be implemented at any suitable devices. For example, the method may be implemented at the second device 120.

At block 1010, the second device 120 transmits a configuration indicating a set of resources allocated for a configured grant (CG) transmission to the first device 110-1. The term "configured grant transmission" used herein can refer to a transmission without dynamic grant. For example, there can be two types of transmission without dynamic grant, configured grant type 1 and configured grant type 2. For configured grant type 1, an uplink grant can be provided by RRC signaling and stored as configured uplink grant. For configured grant type 2, an uplink grant can be provided by e.g. PDCCH and stored or cleared as configured uplink grant based on physical layer signal (e.g. PDCCH DCI) indicating configured activation or deactivation. In some embodiments, the configuration can be transmitted in RRC signaling. Alternatively, the configuration can be transmitted in PDCCH signaling.

At block 1020, the second device 120 receives a CG transmission from the first device 110-1. At block 1030, the second device 120 transmits a response for the CG transmission to the first device 110-1. In this case, the response comprises the TAC. In other words, the second device 120 needs to provide the TAC in the response.

In some embodiments, an apparatus for performing the method 700 (for example, the first device 110) may comprise respective means for performing the corresponding steps in the method 700. These means may be implemented in any suitable manners. For example, it can be implemented by circuitry or software modules.

In some embodiments, the apparatus comprise means for receiving, from a second device, a configuration indicating a set of resources allocated for a configured grant transmission; means for, during the running time of a first timer for validity of the set of resources, transmitting the configured grant transmission to the second device based on the set of resources; means for receiving from the second device a response for the configured grant transmission; and means for stopping the first timer upon reception of a timing advance command from the second device.

In some embodiments, the apparatus further comprises means for starting a second timer for timing alignment upon reception of the timing advance command from the second device.

In some embodiments, the response comprises the timing advance command.

In some embodiments, the apparatus comprises means for, in accordance with a determination that no timing advance command is received from the second device, maintaining running of the first timer until reception of the timing advance command from the second device or until expiration of the first timer.

In some embodiments, the set of resources is valid during the running time of the first timer or the running time of the second timer.

In some embodiments, the configured grant transmission is a configured grant small data transmission.

In some embodiments, the first device comprises a terminal device and the second device comprises a network device.

In some embodiments, an apparatus for performing the method 800 (for example, the first device 110) may comprise respective means for performing the corresponding steps in the method 800. These means may be implemented in any suitable manners. For example, it can be implemented by circuitry or software modules.

In some embodiments, the apparatus comprises means for receiving, from a second device, a configuration indicating a set of resources allocated for a configured grant transmission; means for, during the running time of a first timer for validity of the set of resources, transmitting the configured grant transmission to the second device based on the set of resources; means for receiving from the second device a response for the configured grant transmission; and means for stopping the first timer upon reception of the response from the second device.

In some embodiments, the response comprises a timing advance command.

In some embodiments, the apparatus comprises means for, in accordance with a determination that there is no timing advance command in the response, releasing or suspending the set of resources allocated for the configured grant transmission.

In some embodiments, the apparatus comprises means for starting a second timer for timing alignment upon reception of a timing advance command from the second device.

In some embodiments, the configured grant transmission is a configured grant small data transmission.

In some embodiments, the first device comprises a terminal device and the second device comprises a network device.

In some embodiments, an apparatus for performing the method 900 (for example, the first device 110) may comprise respective means for performing the corresponding steps in the method 900. These means may be implemented in any suitable manners. For example, it can be implemented by circuitry or software modules.

In some embodiments, the apparatus comprises means for receiving, from a second device, a configuration indicating a set of resources allocated for a configured grant transmission; means for, during the running time of a first timer for validity of the set of resources, transmitting the configured grant transmission to the second device based on the set of resources; means for receiving from the second device a response for the configured grant transmission; and means for, in accordance with a determination that there is no timing advance command in the response, declaring a failure of the configured grant transmission.

In some embodiments, the apparatus comprises means for switching to a radio resource control (RRC) inactive state or a RRC idle state.

In some embodiments, the configured grant transmission is a configured grant small data transmission.

In some embodiments, the first device comprises a terminal device and the second device comprises a network device.

Figure 11:
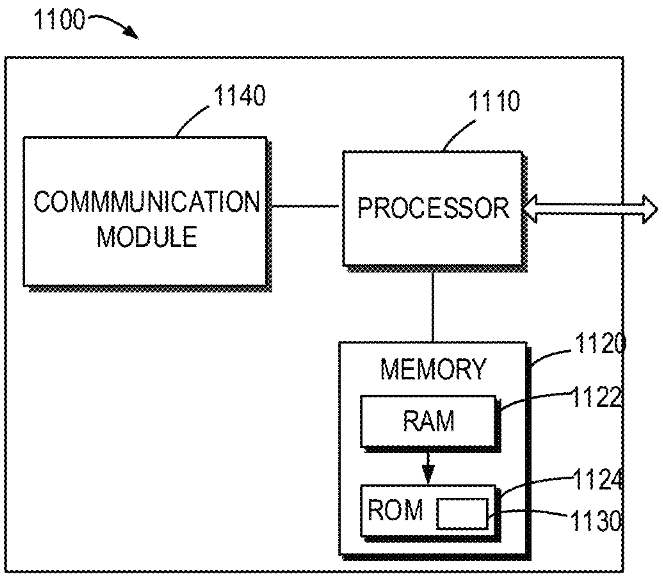
FIG. 11 illustrates a simplified block diagram of an apparatus that is suitable for implementing embodiments of the present disclosure.

FIG. 11 is a simplified block diagram of a device 1100 that is suitable for implementing embodiments of the present disclosure. The device 1100 may be provided to implement the communication device, for example the terminal device 110, or the network device 120 as shown in FIG. 2. As shown, the device 1100 includes one or more processors 1110, one or more memories 1120 coupled to the processor 1110, and one or more communication modules 1140 coupled to the processor 1110.

The communication module 1140 is for bidirectional communications. The communication module 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program 1120 so that the device 1100 may perform any process of the disclosure as discussed with reference to FIGS. 3 and 10. The embodiments of the present disclosure may also be implemented by hardware or by a combination of software and hardware.

Figure 12:
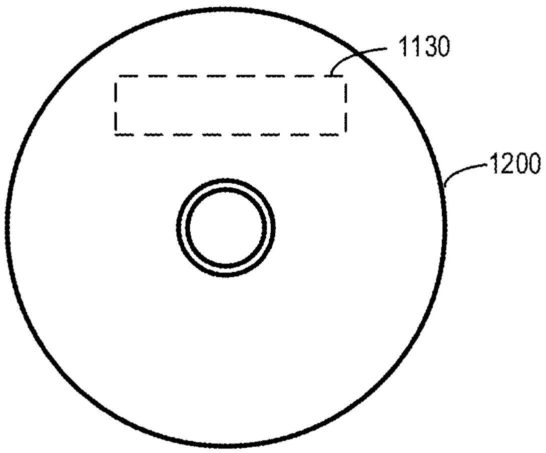
FIG. 12 illustrates a block diagram of an example computer readable medium in accordance with some example embodiments of the present disclosure.

In some example embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods as described above with reference to FIGS. 3-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment.

Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device comprising:

a processor; and a memory comprising computer-executable instructions that, when executed by the processor, cause the first device to perform the following operations:

while the first device is in a radio resource control (RRC) connected state, transmit a configured grant type that indicates pre-configured PUSCH resources to be used for uplink data transmission in an RRC Inactive state as long as a timing alignment of the first device is valid, enabling a second device to transmit an RRC release message, wherein the pre-configured PUSCH resources comprise the following parameters: a configured scheduling radio network temporary identifier (CS-RNTI) for retransmission; periodicity of the configured grant type; an offset of a resource with respect to a system frame number in time domain; time-domain parameters that include a start symbol and a length of an assignment; and a number of hybrid automatically repeat request (HARQ) processes;

transmit, from the first device, a message to the second device when the first device is in the RRC inactive state, wherein the message comprises a preamble for a random access channel (RACH);

receive, from the second device, a random access response;

transmit, to the second device, an RRC connection resume request;

receive, from the second device, a configuration indicating a set of resources allocated for a configured grant transmission;

during a running time of a first timer for validity of the set of resources, transmit the configured grant transmission to the second device based on the set of resources;

receive from the second device a response for the configured grant transmission;

determine that the response does not comprise a timing advance command;

based on determining that the response does not comprise the timing advance command:

stopping the first timer for validity of a configured grant based small stat transmission (CG-SDT); and receive an indication that the set of resources for the configured grant transmission is released, wherein the set of resources for the configured grant transmission is released without RRC reconfiguration.

2. The first device of claim 1, wherein the computer-executable instructions further cause the first device to:

start a second timer for timing alignment upon reception of the timing advance command from the second device.

3. The first device of claim 2, wherein the second timer is a timing alignment timer (TAT).

4. The first device of claim 3, wherein the timing advance command remains valid as long as the second timer is running, and wherein the timing advance command is no longer valid after the second timer expires.

5. The first device of claim 4, wherein the set of resources is only valid during the running time of the first timer.

6. The first device of claim 5, wherein the configured grant transmission is a configured grant small data transmission.

7. The first device of claim 6, wherein the first device comprises a terminal device and the second device comprises a network device.

8. A system comprising:

a first device;

a processor; and a memory comprising computer-executable instructions that, when executed by the processor, cause the first device to perform the following operations:

while the first device is in a radio resource control (RRC) connected state, transmit a configured grant type that indicates pre-configured PUSCH resources to be used for uplink data transmission in an RRC Inactive state as long as a timing alignment of the first device is valid, enabling a second device to transmit an RRC release message, wherein the pre-configured PUSCH resources comprise the following parameters: a configured scheduling radio network temporary identifier (CS-RNTI) for retransmission; periodicity of the configured grant type; an offset of a resource with respect to a system frame number in time domain; time-domain parameters that include a start symbol and a length of an assignment; and a number of hybrid automatically repeat request (HARQ) processes;

transmit, from the first device, a message to the second device when the first device is in the RRC inactive state, wherein the message comprises a preamble for a random access channel (RACH);

receive, from the second device, a random access response;

transmit, to the second device, an RRC connection resume request;

receive, from the second device, a configuration indicating a set of resources allocated for a configured grant transmission;

during a running time of a first timer for validity of the set of resources, transmit the configured grant transmission to the second device based on the set of resources;

receive from the second device a response for the configured grant transmission;

determine that the response does not comprise a timing advance command;

based on determining that the response does not comprise the timing advance command:

stopping the first timer for validity of a configured grant based small stat transmission (CG-SDT); and receive an indication that the set of resources for the configured grant transmission is released, wherein the set of resources for the configured grant transmission is released without RRC reconfiguration.

9. The system of claim 8, wherein the computer-executable instructions further cause the first device to:

start a second timer for timing alignment upon reception of the timing advance command from the second device.

10. The system of claim 9, wherein the second timer is a timing alignment timer (TAT).

11. The system of claim 10, wherein the timing advance command remains valid as long as the second timer is running, and wherein the timing advance command is no longer valid after the second timer expires.

12. The system of claim 11, wherein the set of resources is only valid during the running time of the first timer.

13. The system of claim 12, wherein the configured grant transmission is a configured grant small data transmission.

14. The system of claim 13, wherein the first device comprises a terminal device and the second device comprises a network device.

15. A method comprising:

while a first device is in a radio resource control (RRC) connected state, transmitting a configured grant type that indicates pre-configured PUSCH resources to be used for uplink data transmission in an RRC Inactive state as long as a timing alignment of the first device is valid, enabling a second device to transmit an RRC release message, wherein the pre-configured PUSCH resources comprise the following parameters: a configured scheduling radio network temporary identifier (CS-RNTI) for retransmission; periodicity of the configured grant type; an offset of a resource with respect to a system frame number in time domain; time-domain parameters that include a start symbol and a length of an assignment; and a number of hybrid automatically repeat request (HARQ) processes;

transmitting, from the first device, a message to the second device when the first device is in the RRC inactive state, wherein the message comprises a preamble for a random access channel (RACH);

receiving, from the second device, a random access response;

transmitting, to the second device, an RRC connection resume request;

receiving, from the second device, a configuration indicating a set of resources allocated for a configured grant transmission;

during a running time of a first timer for validity of the set of resources, transmitting the configured grant transmission to the second device based on the set of resources;

receiving from the second device a response for the configured grant transmission;

determining that the response does not comprise a timing advance command;

based on determining that the response does not comprise the timing advance command:

stopping the first timer for validity of a configured grant based small stat transmission (CG-SDT); and receiving an indication that the set of resources for the configured grant transmission is released, wherein the set of resources for the configured grant transmission is released without RRC reconfiguration.

16. The method of claim 15, further comprising starting a second timer for timing alignment upon reception of the timing advance command from the second device.

17. The method of claim 16, wherein the second timer is a timing alignment timer (TAT).

18. The method claim 17, wherein the timing advance command remains valid as long as the second timer is running, and wherein the timing advance command is no longer valid after the second timer expires.

19. The method of claim 18, wherein the set of resources is only valid during the running time of the first timer.

20. The method of claim 19, wherein the configured grant transmission is a configured grant small data transmission.

* * * * *